Patented July 16, 1946

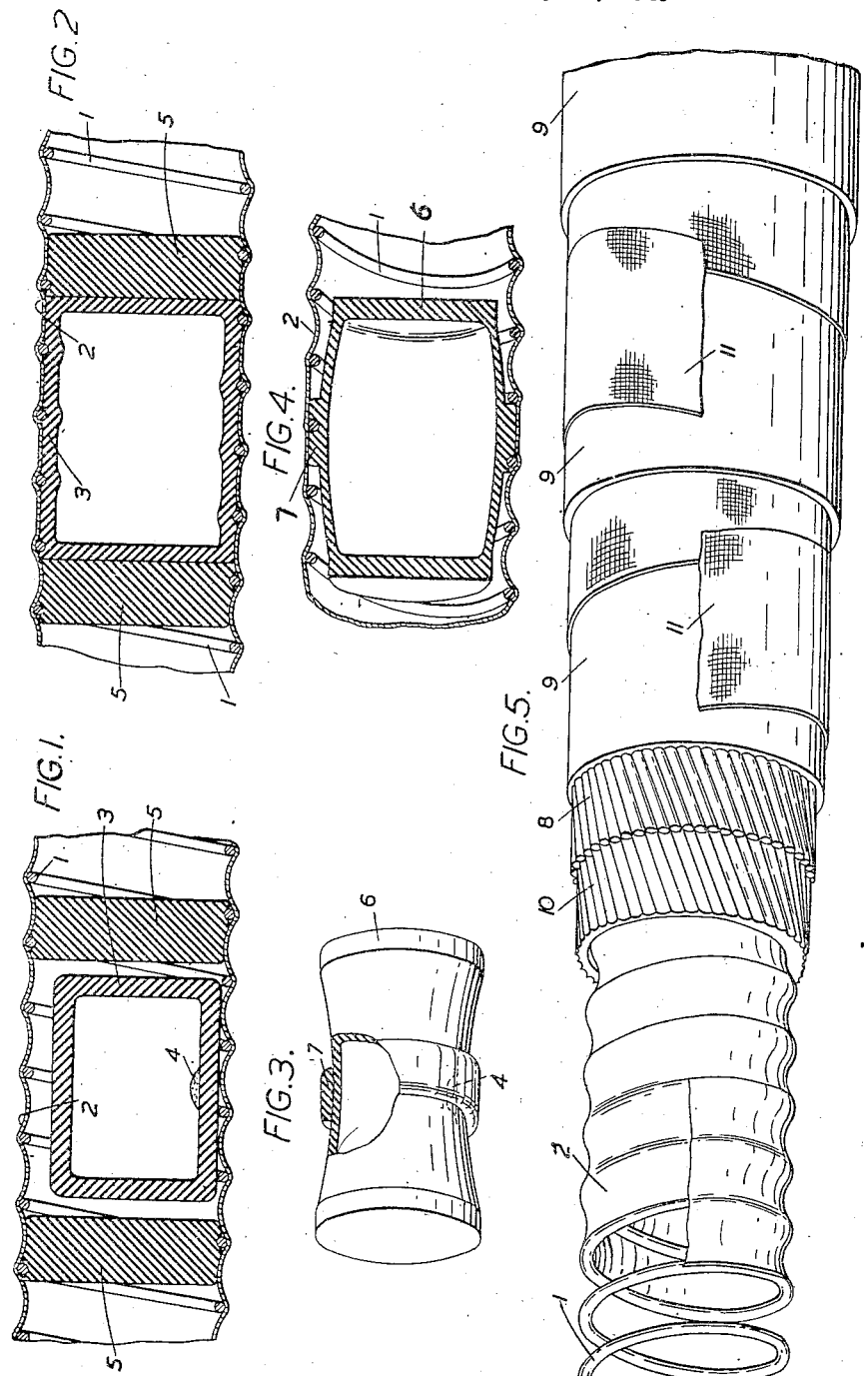

2,404,239

UNITED STATES PATENT OFFICE 2,404,239

ELECTRIC CABLE

Hector Atherton Macdonald, Gravesend, England, assignor to W. T. Henley's Telegraph Works Company Limited, Dorking, Surrey, England, a British company Application May 18, 1943, Serial No. 487,519
In Great Britain September 6, 1941

11 Claims. (Cl. 174—110)

This invention relates to the manufacture of electric cable of the kind which is rendered buoyant in water by the incorporation therein of a flexible core the length of which is extensively sub-divided to form a plurality of closed hollow cells. It is more particularly concerned with the construction of this flexible core which constitutes the buoyancy element or one of a number of such buoyancy elements. By the present invention we are enabled to provide a buoyancy element that is very flexible in a longitudinal direction but strongly resistant to radial compression and yet is extremely light. In accordance with the invention, the buoyancy element comprises a longitudinally flexible helix resistant to radial compression, which is enclosed in a flexible waterproof covering and divided along its length into a plurality of closed compartments by hollow plugs of rubber expanded in situ within the covering and having peripheral surfaces moulded to the internal surface of the covering.

In the foregoing statement and hereinafter where the context permits the term "rubber" includes natural rubber compositions and synthetic rubber-like compositions, such as, for instance, neoprene compositions, which by reason of their relevant physical properties are obvious alternatives to natural rubber compositions.

The invention will now be more fully described with frequent reference to the accompanying drawing which shows, by way of example, only buoyancy elements constructed in accordance with the invention and cable embodying such elements. In the drawing, Figure 1 is a longitudinal section of a length of buoyancy element incorporating one form of hollow plug, at an intermediate stage of manufacture, Figure 2 is a corresponding view of the same length of buoyancy element at a later stage of manufacture, Figure 3 is a perspective view of an alternative form of plug at an intermediate stage in its manufacture, Figure 4 is a corresponding view of the same plug within a covered open helix at a later stage in its manufacture, Figure 5 is a perspective view of the stepped end of a buoyant electric cable incorporating a buoyancy element of the form shown in Figure 2.

In the form of construction of buoyancy element shown in Figures 1 and 2 of the drawing, the helix 1 is of open form and is made of wire of circular cross-section but, alternatively, it may be made of wire or strip of other sections such as rectangular, channel or arcuate. Usually a steel wire will be satisfactory, but where great buoyancy is required a lighter metal or alloy may be employed. Instead of a helix of metal wire or strip, a helix of hard non-metallic material may be used, as in the form of construction shown in Figure 4 to which reference will be made later. Examples of suitable non-metallic materials are hard rubber and synthetic plastics such as cellulose acetate or other cellulose derivatives, polyvinyl-chloride or other polyvinyl derivatives, all suitably plasticised.

The waterproof covering 2 enclosing the helix may be of tough rubber or be built up of rubber proofed fabric tape, e. g. cotton tape. Where the covering 2 is required to form an external part of the cable, the former type of covering is preferred; where it is required to form an internal part of the cable, the latter form of covering is preferred, on account of lightness and flexibilty. The proofed fabric form of covering may be formed by applying a single tape helically on the helix with about a two-thirds overlap so that a composite covering of three layers thickness results. The tape is so applied that it forms a transversely corrugated wall.

The covered helix is divided along its length into a plurality of closed compartments by hollow plugs of rubber which are expanded in situ within the helix. These are formed by inserting in the covered helix, either during or after its manufacture, loose fitting hollow drums 3 of unvulcanised or partly vulcanised rubber which contain an appropriate amount of gas-liberating substance 4, for instance, ammonium nitrite. A drum of this form is shown in Figure 1. The buoyancy element is then heat treated to liberate gas from the gas-liberating substance therein and thereby expand the hollow drums and mould the peripheral walls thereof to the internal surface of the waterproof covering 2, as shown in Figure 2. Where the unexpanded drum 3 is of unvulcanised rubber, precautions must be taken to limit expansion in a longitudinal direction and concentrate it in a radial direction. For instance, discs 5 of soft vulcanised rubber can be wedged in the helix on each side of the drum, which, when expanded, is pressed tightly against the inside wall of the covering 2 and the end walls of the discs 5 and, preferably, becomes vulcanised thereto.

An example of a mix suitable for moulding the drums 3 shown in Figure 1 is as follows:

| | Parts by weight |
|---|---|
| Rubber | 55.65 |
| Light magnesia carbonate | 29.0 |
| Pine tar | 5.0 |
| Sulphur | 2.25 |
| Diphenylguanidine | 0.28 |
| Dibenzothiazyldisulphide | 0.36 |
| Calcined magnesia | 1.26 |
| Zinc oxide | 5.6 |
| Nonox | 0.6 |

With this mix, the drum may be expanded and its peripheral wall united to the wall of the covering 2 by subjecting it to an appropriate heat treatment which will naturally depend to some extent on the size of the buoyant element, but for an element of about 1.75 inches overall diameter a suitable treatment consists in warming up the covered helix with steam at atmospheric pressure for thirty minutes, gradually increasing the steam pressure to forty pounds per square inch during a succeeding period of sixty minutes, maintaining a steam pressure of forty pounds per square inch for a further period of ten minutes and thereafter gradually releasing the steam pressure. The amount of gas-liberating substance may be such as to produce an inflation pressure of the order of three pounds per square inch.

In place of the unvulcanised or partly vulcanised hollow plugs there may be introduced into the helix plugs of the form shown in Figure 3. This plug comprises a hollow drum 6 of vulcanised rubber and carries on its circumferential surface a layer 7 of unvulcanised rubber. Heat treatment of the buoyancy element containing such plugs will then liberate gas from the substance 4 within the drum to create pressure to distend the circumferential wall thereof and force the soft unvulcanised rubber 7 through the helix 1, which in this case is of non-metallic material, and into contact with the covering 2 enclosing it, as shown in Figure 4. The layer 7 will preferably be allowed to become vulcanised to the covering 2. The unvulcanised rubber layer 7 may have the following composition:

| | Parts by weight |
|---|---|
| Rubber | 81.7 |
| Paraffin wax | 1.95 |
| Carnauba wax | 4.9 |
| Light magnesium carbonate | 4.9 |
| Zinc oxide | 2.5 |
| Sulphur | 2.2 |
| Stearic acid | 1.2 |
| Mercaptobenzothiazole | 0.65 | and the vulcanised rubber drum on which it is carried may be made from a mix having the same composition as that given for the drums 3 described with reference to Figures 1 and 2.

To expand the drum 6 and cure the unvulcanised layer 7, the buoyancy element comprising the covered helix and the drums contained therein may be heat treated in the same way as described with reference to the element containing hollow plugs 3 of unvulcanised rubber. The pressure required within the drum will naturally depend upon the elasticity of the drum wall and the internal clearance between it and the covering 2. A pressure of the order of three pounds per square inch will generally be found to be satisfactory.

To accommodate the unvulcanised layer 7, the peripheral wall of the drum may be of re-entrant form, whilst distention in a radial direction may be facilitated by making the circumferential wall thinner than the end walls or of non-circular form.

In constructing in accordance with this invention a heavy current cable of the kind having a conductor built up of a large number of small diameter wires laid round a core of large diameter constituting the buoyancy element, and enclosed in a sheath of tough vulcanised rubber, it is at present preferred to make the buoyancy element independent of the outer sheath in order to avoid any possible difficulties in obtaining a joint between the expanded plugs and this outer sheath which is separated from them by the hollow conductor. That is to say, it is preferred to apply a waterproof covering directly to the helix, to lay up the conductor wires over this covering, and then to apply the outer tough rubber sheath. Figure 5 of the drawings shows an example of such a cable. The buoyancy element is similar to that described with reference to Figures 1 and 2 of the drawing and consists of an open steel wire helix 1 wrapped helically with cotton tape 2 proofed on the inside and applied with overlap. The hollow plugs 3 are not shown but are of the form shown in Figure 2. The conductor 8 may be stranded directly on the taped helix and furnished with a covering 9 of tough rubber. By appropriate choice of accelerators, the hollow plugs can be expanded and vulcanised to the internal surface of the taped covering on the helix and the outer covering of tough rubber can be vulcanised in a single heat treatment. For example, if the hollow plugs are made from a rubber mix of the composition given above and the outer sheath by extrusion of a mix consisting of:

| | Parts by weight |
|---|---|
| Rubber | 61.0 |
| Paraffin wax | 0.9 |
| Stearic acid | 2.4 |
| Zinc oxide | 3.0 |
| Sulphur | 1.7 |
| Carbon black | 29.6 |
| Mercaptobenzothiazole | 0.5 |
| Nonox | 0.9 |

An appropriate heat treatment comprises warming up the cable with steam at atmospheric pressure for 30 minutes, followed by gradual increase of steam pressure to 40 lbs. per square inch during 60 minutes, followed by maintenance of a steam pressure of 40 lbs. per square inch for 10 minutes, followed by gradual release of steam pressure. Additional security against longitudinal seepage of water in the event of damage to the outer covering is obtained by using for the covering 2 a fabric tape proofed on both sides and by applying a layer 10 of rubber over the taped covering before applying the conductor 8, so that after vulcanisation the seal extends from the hollow plug 3, through the fabric cover 2 and the spaces between the conductor wires 8, to the outer tough rubber covering 9. In the latter there may be incorporated one or more fabric tapes 11 for reinforcing purposes, in which event it will be extruded in two or more layers or built up of lappings of tape, the layers of rubber mix with a high carbon black content being interleaved with layers having a low carbon black content, for instance, layers of a mix of the following composition:

| | Parts by weight |
|---|---|
| Rubber | 81.6 |
| Paraffin wax | 1.95 |
| Carnauba wax | 4.9 |
| Light magnesium carbonate | 4.9 |
| Zinc oxide | 2.5 |
| Sulphur | 2.2 |
| Carbon black | 0.1 |
| Stearic acid | 1.2 |
| Mercaptobenzothiazole | 0.65 |

What I claim as my invention is:

1. In a tubular buoyancy element comprising a longitudinally flexible helix resistant to radial compression and a flexible waterproof covering enclosing said helix, means comprising a number of inflated hollow rubber bodies expanded within said covering and having peripheral walls with external surfaces thereon moulded to the internal surface of said covering, for dividing the interior of the element into a plurality of closed compartments.

2. In a tubular buoyancy element comprising a longitudinally flexible helix resistant to radial compression and a flexible waterproof covering enclosing said helix, means comprising a number of inflated hollow rubber bodies expanded within said covering and having peripheral walls with external surfaces thereon mouded, bonded and vulcanised to the internal surface of said covering, for dividing the interior of the element into a plurality of closed compartments.

3. A tubular buoyancy element comprising an open helix resistant to radial compression, a covering enclosing said helix and consisting of at least one helical lapping of rubber-treated fabric tape, and means, comprising a number of inflated hollow rubber bodies expanded within said covering and having peripheral walls with external surfaces thereon moulded to the internal surface of said covering, for dividing the element into a plurality of closed compartments.

4. A tubular buoyancy element comprising an open helix resistant to radial compression, a covering enclosing said helix and consisting of at least one helical lapping of rubber-treated fabric tape, and means, comprising a number of inflated hollow rubber bodies expanded within said covering and having peripheral walls with external surfaces thereon moulded to the internal surface of said covering and vulcanised thereto, for dividing the element into a plurality of closed compartments.

5. In a tubular buoyancy element comprising a longitudinally flexible helix resistant to radial compression and a flexible waterproof covering enclosing said helix, means for dividing the interior of the element into a plurality of closed compartments, said means comprising a number of inflated rubber bodies expanded within said covering and rubber annuli embracing said inflated bodies and each having internal and external surfaces moulded and vulcanised to external surfaces of the peripheral walls of the underlying inflated bodies and the adjacent internal surface of said covering, respectively.

6. A buoyant electric cable comprising an open helix resistant to radial compression, a flexible waterproof covering enclosing said helix, a flexible sheath of tough rubber comprising two component layers and enclosing the said covering, a conductor consisting of a number of helically extending wires disposed between said two component layers, and means, comprising a plurality of hollow rubber plugs expanded within said waterproof covering and having peripheral surfaces moulded to the internal surface thereof, for dividing the interior of the cable into a plurality of compartments.

7. A buoyant electric cable comprising an open wire helix, a covering enclosing said helix and consisting of at least one helical lapping of rubber treated fabric tape, a flexible sheath of tough rubber surrounding said fabric covering and comprising two component layers, a conductor consisting of wires disposed between said two component layers and means for dividing the interior of the cable into a plurality of watertight compartments, said means comprising a plurality of hollow rubber plugs expanded within said fabric covering and having peripheral surfaces moulded and vulcanised to the internal surface of said fabric covering which is bonded and vulcanised to said sheath.

8. A method of making an elongated buoyancy element suitable for a buoyant electric cable, comprising positioning a plurality of expansible hollow rubber plugs each containing a gas-liberating substance within a longitudinally flexible helix, applying a flexible waterproof covering to said helix, and heat treating said plugs to liberate gas from the gas-liberating substance therein and thereby expand them and mould their peripheral surfaces to the internal surface of said covering whereby to divide the interior of said element into closed compartments.

9. A method of making an elongated buoyancy element suitable for a buoyant electric cable, comprising introducing a hollow body of unvulcanised rubber, containing a gas-liberating substance, into a longitudinally flexible helix at intervals in the length thereof, applying a flexible waterproof covering to said helix, heat treating each hollow body to liberate gas from the gas-liberating substance therein and thereby expand the body and mould the peripheral wall of the body to the internal surface of said waterproof covering, and continuing the heat treatment to vulcanise the expanded hollow bodies.

10. A method of making a buoyancy element suitable for a buoyant electric cable, comprising introducing into a longitudinally flexible helix, at intervals in its length and during manufacture thereof, a hollow body of unvulcanised rubber, containing a gas-liberating substance and a pair of tight-fitting discs, one on each side of the body, applying a flexible waterproof covering to said helix, heat treating each said hollow body to liberate gas from the gas-liberating substance therein and thereby expand the body in a radial direction and mould the peripheral walls thereof to the internal surface of said waterproof covering and its end walls to the adjacent surfaces of said discs, and continuing the heat treatment to vulcanise the expanded hollow body.

11. A method of making a buoyancy element suitable for a buoyant electric cable, comprising introducing into a longitudinally flexible helix at intervals in the length thereof a hollow body of soft vulcanised rubber, containing a gas-liberating substance and having on its external peripheral surface a layer of unvulcanised rubber, applying a flexible waterproof covering to said helix, heat treating each said hollow body to liberate gas from the gas-liberating substance therein and thereby expand the said body and mould the peripheral surface of said unvulcanised rubber layer to the adjacent internal surface of said cover, and continuing the heat treatment to vulcanise said layer.

HECTOR ATHERTON MACDONALD.